United States Patent [19]

Yu et al.

[11] Patent Number: 4,717,011
[45] Date of Patent: Jan. 5, 1988

[54] SORTING CONVEYOR WITH CROSS-OVER

[75] Inventors: Thomas C. Yu; Robert K. Vogt, both of Cincinnati, Ohio

[73] Assignee: The E.W. Buschman Company, Cincinnati, Ohio

[21] Appl. No.: 857,915

[22] Filed: Apr. 30, 1986

[51] Int. Cl.[4] .............................................. B65G 47/46
[52] U.S. Cl. .................... 198/365; 198/370; 198/372
[58] Field of Search ............... 198/365, 370, 449, 372, 198/456

[56] References Cited

U.S. PATENT DOCUMENTS

| | | | |
|---|---|---|---|
| 3,361,247 | 1/1968 | Lauzon et al. | 198/370 X |
| 3,367,477 | 2/1968 | Leth | 198/456 X |
| 3,770,100 | 11/1973 | McCaul | 198/372 |
| 3,986,596 | 10/1976 | Hamilton | 198/365 |
| 4,223,777 | 9/1980 | Aykut | 198/365 |

FOREIGN PATENT DOCUMENTS 2745298 11/1978 Fed. Rep. of Germany ... 198/482.1

Primary Examiner—Robert J. Spar
Assistant Examiner—D. Glennn Dayoan
Attorney, Agent, or Firm—Biebel, French & Nauman

[57] ABSTRACT

A continuous apron type sortation conveyor having carton pushers which travel with and crosswise of the apron is provided with branch lines arranged in pairs directly opposite each other along the main line. A pair of oppositely angled guide tracks for the pushers is positioned between each opposed pair of branch lines, but these tracks are interrupted at their crossing point to provide a gap, and a switching assembly in this gap is movable between aternative positions wherein it fills the interruption in one or the other track to enable pusher elements to travel across from either side of the apron as desired to deliver a carton to one or the other of an opposed pair of branch lines.

8 Claims, 9 Drawing Figures

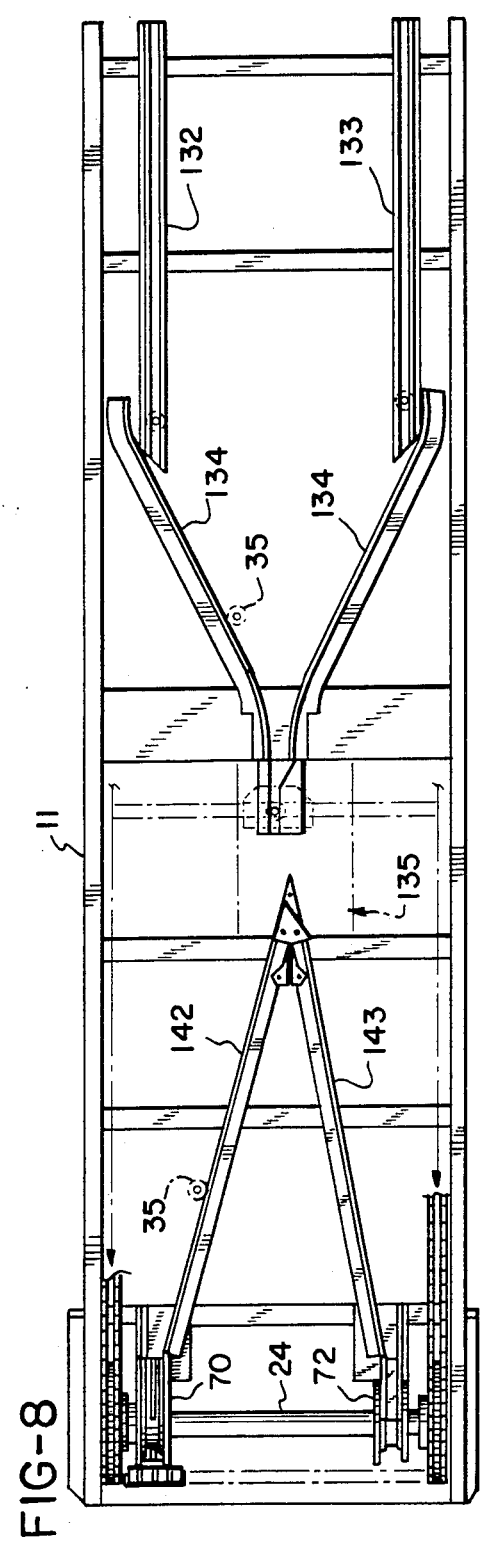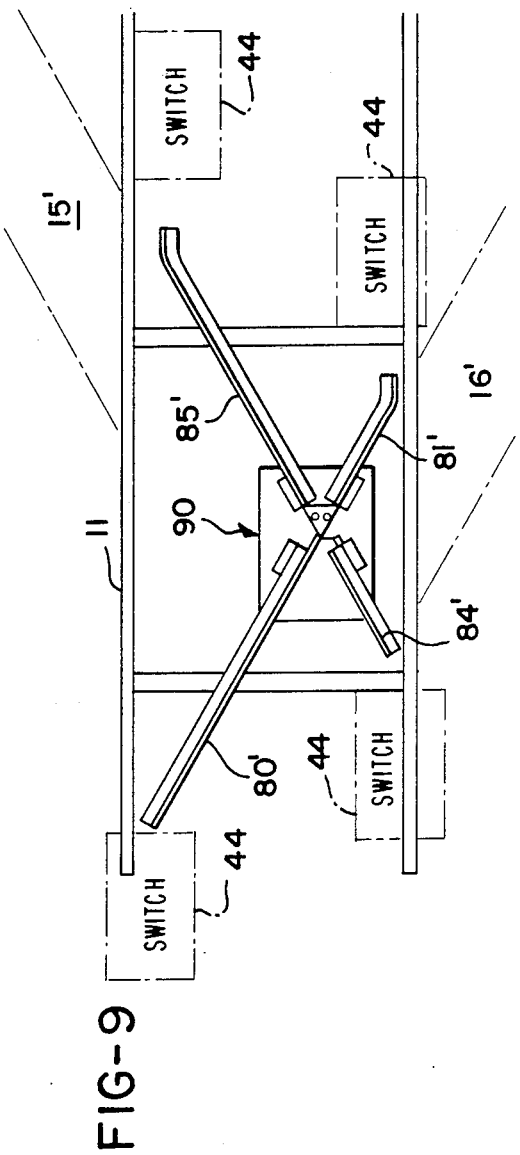

SORTING CONVEYOR WITH CROSS-OVER

BACKGROUND OF THE INVENTION

This invention relates to package cartons, and more particularly to apron-type sortation conveyors provided with branch lines to which selected cartons can be diverted out of the main line. The present invention provides an addition to or an improvement on the sortation conveyor disclosed in the application of Thomas C. Yu et al, Ser. No. 675,156, (hereinafter referred to as "Case A"), filed Nov. 27, 1984 and assigned to the same assignee as this application, hereinafter referred to as "Case A".

The invention is particularly concerned with such conveyors wherein the branch lines are arranged in directly opposed pairs along the main conveyor line. The primary object of the invention is to provide such a conveyor wherein such pairs of branch lines can be spaced as closely as possible to each other along the main line.

The sortation conveyor disclosed in Case A includes a frame defining the main line of the conveyor and at least one branch outlet therefrom, an endless apron supported for movement on the frame to define the top conveying run and a bottom return run, a plurality of pusher elements mounted for movement with the apron and also for sliding movement across the apron from one side thereof to the other, and selectively operable means for causing a desired number of pusher elements to move across the apron as they move forward with it and thereby to push the selected carton from the apron onto the selected branch conveyor.

More specifically, each of the pusher elements is equipped with a guide pin which depends therefrom, and when the pusher elements are in their normal rest positions along one side of the conveyor apron, each of these pins will pass in succession through a channeled switch member pivoted to swing between a retracted position parallel with the course of the apron and an advanced position at an acute angle to the apron course wherein it cooperates with the guide pins on successive pusher elements to divert those elements away from the side of the apron.

As soon as each diverter pin leaves the switch member, it is caused to engage a guide track which extends across the frame at an angle to the apron course. The forward movement of the pusher element with the apron will also cause it to be cammed by the guide track laterally across the apron and thereby to cooperate with successive similarly cammed pusher elements to push the selected carton onto the branch conveyor. Provision is made for returning each diverted pusher elements back to a rest position during its travel on the bottom return run of the apron back to the upstream end of the main conveyor line.

The operation of the conveyor disclosed in Case A requires that the guide pin on each diverted pusher element be continuously guided across the width of the apron until it completes its carton-ejecting movement. This is readily accomplished in that application by guiding the guide pin by means of a guide track extending at an angle across the entire width of the conveyor. That arrangement, however, requires that if it is decided to have branch outlets on both sides of the main conveyor, they cannot be located opposite each other but must be spaced alternately on the two sides of the main conveyor. The primary objective of the present invention is to modify that conveyor in order to make it possible to accommodate branch conveyors arranged in directly opposed pairs along the main conveyor line.

SUMMARY OF THE INVENTION

A conveyor in accordance with the present invention will include all of the major components of the conveyor disclosed in Case A, and the disclosure of that application is accordingly incorporated herein by reference. In that conveyor, the movement of selected pusher elements across the main conveying apron to push a carton onto a branch line is caused by a guide track which extends at an angle across the conveyor frame below the top apron run at a position aligned laterally with the discharge outlet to the branch conveyor. As shown in Case A, each such guide track is continuous from one side of the frame to the other, and it can therefore guide the pusher elements in only one lateral direction.

In order to work with branch conveyors arranged in aligned pairs on opposite sides of the main conveyor frame, it is necessary that provision be made for guiding a carton from the main conveyor line onto either of two opposed branch conveyors. This in turn means that provision must be made for causing selected pusher elements to move from either side of the top apron run to the other side, depending upon the side of the main conveyor to which a particular carton is to be delivered. The essence of the present invention is the provision of such selective guiding means.

The invention accomplishes that objective by the provision of a selective cross-over switching assembly which includes a pair of oppositely angled track elements positioned between the branch lines of an opposed pair in cross-defining relation. Each of these track elements, however, is in two parts which are spaced longitudinally from each other to provide a gap therein around the center of the cross which the two track elements define.

A supplemental guide element is mounted for movement within this gap area between two limit positions wherein it fills in the gap in one or the other of the two-part track elements, depending upon which of the two branch conveyors is to receive a diverted carton. In other words, if a carton traveling on the main conveyor is to be diverted to the left branch conveyor, the appropriate number of pusher elements will be caused to begin diverting movement to the left for that carton, and at the same time, the supplemental guide element will be moved to the position wherein it fills in the gap in the left-diverting track element so that each of the appropriate number of pusher elements will be guided completely across the top apron run to effect side delivery of the carton.

The supplemental guide element can remain in its left position so long as it is needed there and also so long as it is not needed for delivery to the right-hand one of that pair of branch outlets. Then when the latter occasion arises, the supplemental guide element will be moved to its other limit position in order to assure proper operation of the number of pusher elements required to effect delivery of the selected carton to the right branch conveyor.

Details of the means by which the objectives and operating characteristics of the invention as summarized above are achieved will be more readily understood from the detailed description of the preferred embodiments of the invention which follows.

BRIEF DESCRIPTION OF THE DRAWINGS

FIG. 8 is a fragmentary view looking upwards from below the upstream end of the conveyor shown in FIG. 5; and FIG. 9 is a fragmentary and somewhat diagrammatic plan view illustrating a modified construction in accordance with the invention.

DESCRIPTION OF THE PREFERRED EMBODIMENTS

Figure 1:
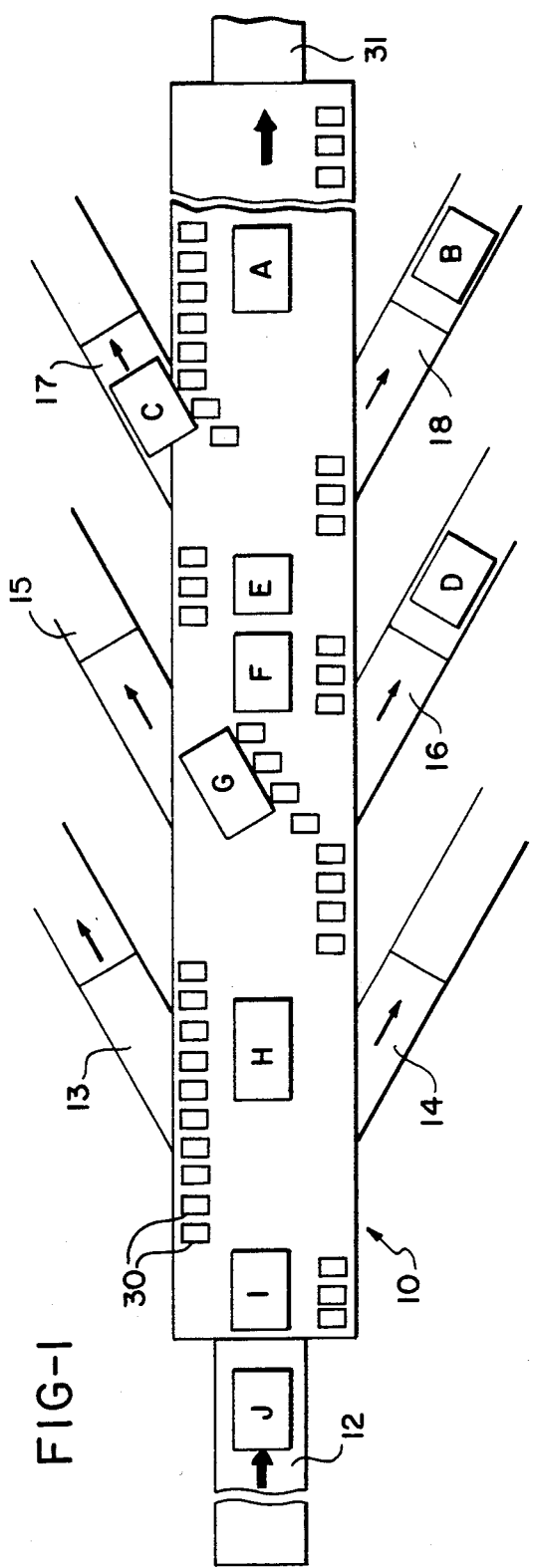
FIG. 1 is a schematic plan view illustrating the operation of a sortation conveyor in accordance with the present invention.

FIG. 1 shows a carton conveyor system including a sortation section 10 in a frame generally designated as 11 in other views. The sortation section 10 receives successive cartons from a supply line 12 and sorts them to branch conveyors 13-14, 15-16 and 17-18, which are connected thereto in directly opposed pairs. An endless apron 20 is supported for driven movement on the frame 11 to define a top conveying run moving from left to right in the drawing and a bottom return run. The apron 20 is composed of a pair of roller chains 21 and multiple parallel cross tubes 22 carried by these chains, which are supported by idler sprockets 23 on a shaft 24 at the upstream end of the conveyor section and are driven by drive sprockets 25 on a shaft 24 driven by a motor 27 at the downstream end of the frame. It will be understood that any number of branch lines can be used as desired.

A pusher element 30 is mounted for sliding movement on each pair of cross tubes 22. As described hereinafter, these pusher elements are stationed along one side or the other of the apron 20 when they begin their travel from the upstream end of the conveyor. The control system, which commonly includes a computer, will determine on which of the two sides of the apron each pusher element should be, in accordance with its desired diverting action during its movement with the top apron run. When a carton traveling on the apron approaches the branch conveyor to which it is to be diverted, the pushers 30 traveling on the apron beside that carton will be on the correct side of the apron for movement across it in such timed relation with the travel of the apron that they push that carton onto the appropriate branch conveyor.

Thus in FIG. 1, carton A is intended for delivery to a station downstream from the pair of branch conveyors 17-18 on the right side of the main conveyor, or it may continue on the next conveyor section 31. The carton B, which had preceded carton A on the main line, was diverted to branch conveyor 18, and the carton C which directly followed carton A on the main conveyor is in the process of being diverted onto branch conveyor 17.

The pushers 30 aligned laterally with carton E in FIG. 1 are on the left side of the apron so that carton E may be diverted to branch line 18 or continue past it, while carton F may similarly be diverted to branch line 17 or travel past it. Carton D, which had been between cartons D and E on the main line, has been diverted to branch line 16, and carton G is in the process of being diverted onto branch line 15. The pusher elements aligned with carton H are on the left of the apron, and that carton may therefore be delivered to either of branch lines 16 and 18 or may travel therepast. Similarly carton I may be delivered to any branch line on the left side of the conveyor, and the pushers for carton J, which is still on supply conveyor 12, have not yet come up to the top run of the apron.

Figure 3:
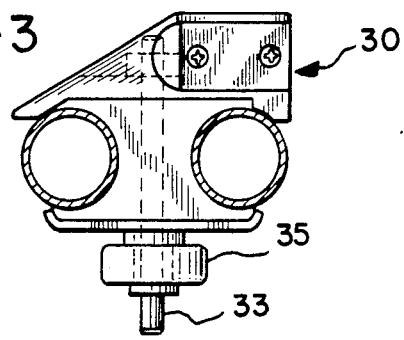
FIG. 3 is a side elevation of one of the pusher elements incorporated in the conveyor of the invention.

One of the pusher elements 30 is shown in FIG. 3 as of the same construction disclosed in Case A. Each includes a guide pin 33 that depends therefrom and carries an anti-friction bearing 35 which engages the appropriate guide track or tracks during operating movement of the pusher element. As also shown in Case A, the guide pins 33 are normally retained along one side or the other of the apron by means of one of a pair of channel-shaped guides 40 and 42 which extend along the opposite sides of the frame.

As already noted, and as described hereinafter, when each successive pusher 30 approaches the upstream end of the upper apron run, it has already been positioned on the proper side of the apron opposite the side to which it will push the carton laterally aligned therewith on the apron. This pushing action of the pushers is initiated by the appropriate one of the switch assemblies 44, which are positioned in pairs on opposite sides of the frame just upstream from each pair of branch outlets.

Figure 4:
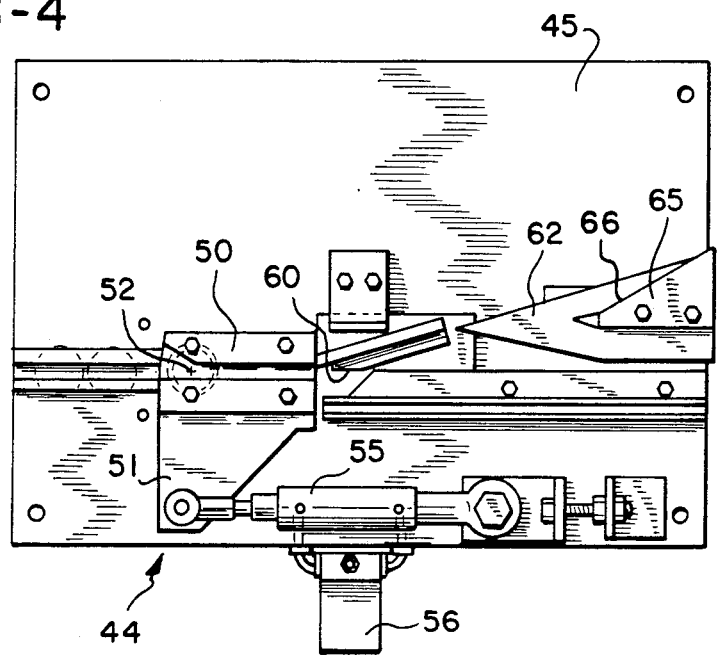
FIG. 4 is a plan view of one of the switching assemblies for diverting selected pusher elements to travel across the conveyor to deliver a carton to the opposite side.

The switch assemblies 44 on the left side of the frame may be constructed identically with the disclosure of Case A, while those on the right side of the frame may be of the same construction but of the opposite hand. For convenience of reference, one of the left-hand switch assemblies 44 is shown in FIG. 4. It is carried on a mounting plate 45 secured on the frame below the top run of the apron 20, and the primary switch member is a short length of channeled pin guide 50 which is bolted to a plate 51 mounted for pivotal movement on the plate 45 about the axis 52.

A double-acting fluid pressure cylinder 55 controlled by a solenoid valve 56 operates to move the switch member 50 between a retracted position, wherein it is aligned with the pin guide channel 40, and an advanced position at an angle to the pin guide 40, wherein it diverts successive pusher element guide pins 33 along a correspondingly angularly aligned path with respect to the pin guide 40. During the initial stage of this diverted movement, each guide pin 33 will travel first along the left-hand side of a blade 60 and thence along the left-hand side of a generally triangular guide plate 62 rigidly mounted on mounting plate 45. A second fixed guide plate 65 is bolted on top of guide plate 62, and it has a guiding edge 66 set back from the guiding edge of guide plate 62 for engagement with the bearing 35 on each diverted guide pin.

As already noted, the switch assemblies 44 on the right-hand side of the conveyor frame are left-hand versions of those on the left side of the frame. In operation, therefore, the right-hand switch assemblies 44 are similarly caused to divert a series of successive pusher elements 30 away from the path established by the pin guides 42 and along a path directed obliquely towards the left side of the apron 20. The present invention is concerned primarily with the provision of means for causing diverted pusher elements to follow paths which cross in the middle of the main conveyor, as now described.

Figure 5:
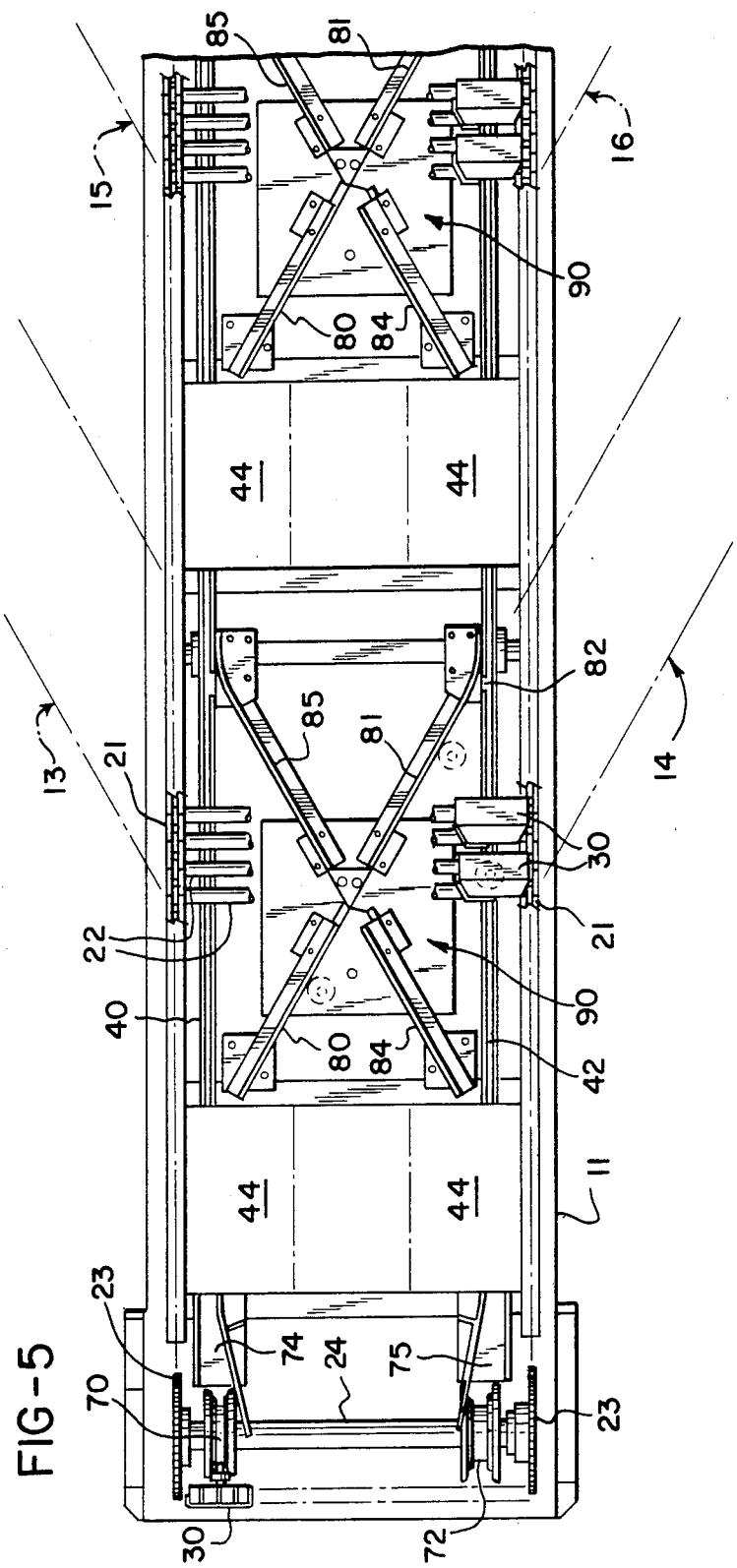
FIG. 5 is a partial plan view of the upstream end of the sortation conveyor of the invention.

Referring particularly to FIG. 5, and as described hereinafter, each pusher 30 reaches the upstream end of the top run of apron 20 on the appropriate one of the guide pulleys 70 and 72 on the idler shaft 24 which also carries the idler sprockets 23 for the chains 21. A pair of guide members 74–75 of opposite hand lead from these two guide pulleys to the respective pair of switches 44 which operate either to direct such pushers to one of the guide tracks 40 and 42 for continued travel along the side of the apron 20, or to divert a preselected number of pushers across the apron if they are to deliver a carton to one of the initial pair of branch conveyors 13 and 14, as now described.

Referring particularly to FIG. 5, the downstream end of the guide surface 66 in the left-hand switch 44 meets the upstream end of the right-hand side of a guide track 80 extending diagnonally part way across the conveyor frame but stopping short of the center thereof. A second guide track 81 is mounted in aligned spaced relation with the track 80 on the opposite side of the center of the conveyor frame, but there is a gap between the adjacent ends of these two tracks which is of substantial extent, e.g. six inches. At its downstream end, the track 81 curves slightly inwardly and there is a slot 82 in the inner wall of the pin guide 42 to admit successive guide pins 33 into the guide 42 after they have completed travel across the conveyor.

There is an identical pair of guide tracks 84 and 85 extending obliquely across the conveyor frame from the right-hand switch assembly 44 on the right side of the conveyor frame to the pin guide 40 at the left side of the conveyor. These pairs of guide tracks 80-81 and 84-85 thus define a cross having an open center as a result of the gaps between the two parts of each pair.

Figure 6:
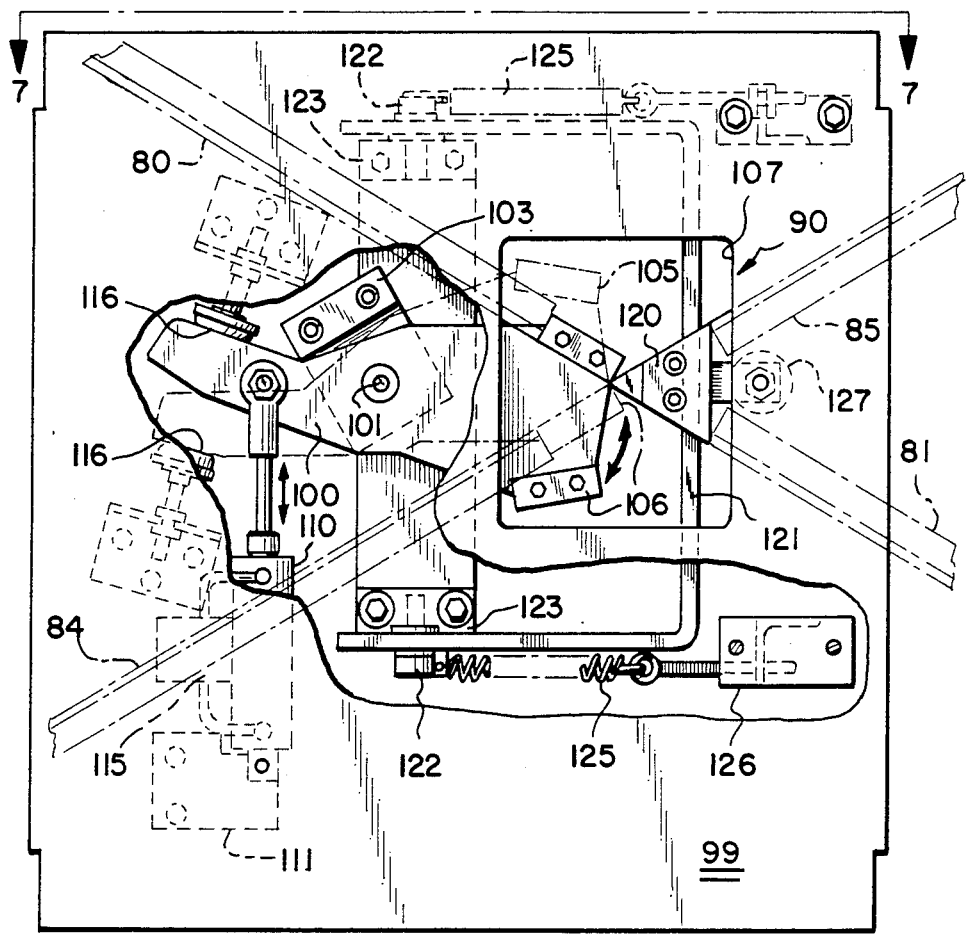
FIG. 6 is a fragmentary plan view showing the switching assembly which is incorporated in each of the cross-over sections of the conveyor.
Figure 7:
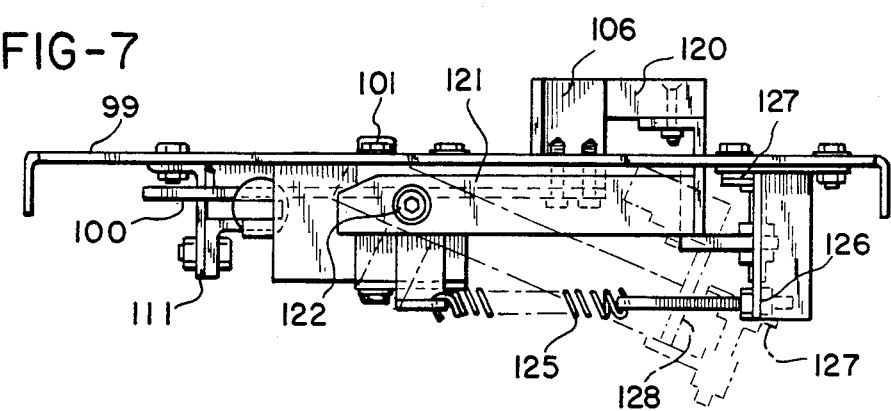
FIG. 7 is a side view taken as indicated by the line 7—7 of FIG. 6.

In this gap is a switch assembly indicated generally at 90 in FIG. 5 and shown in enlarged detail in FIGS. 6–7. The mounting plate 99 for the switch assembly 90 underlies the gap between the guide tracks 80–82 and 84–85, and the main element of this switch assembly is the swivel plate 100, which is mounted for pivotal movement below the plate 99 by the bearing assembly on a pivot bolt 101 carried by a right angled bracket 103 depending from the underside of mounting plate 99.

A pair of guide blocks 105 and 106 are mounted in angular relation on top of the downstream end of the swivel plate 100 and extend through an opening 107 in mounting plate 99 to the level of the guide tracks 80-85. These blocks 105 and 106 converge in the downstream direction to a minimum spacing through which the roller 35 on a pusher can freely pass, and the arrangement is such that the swivel plate 100 can be moved between two limit positions wherein the inner surface of one of these guide blocks forms a continuation of the inner surface of the one of the guide tracks 80 or 84 respectively.

Pivotal movement of the swivel plate 100 is effected by a double-acting fluid pressure cylinder 110 mounted on the underside of the plate 99 by a bracket 111, and having its piston pivotally connected to the swivel plate 100. Operation of the cylinder 110 is controlled by a solenoid valve assembly 115 shown as of the same type as the valve assembly 56 in each of switch assemblies 44. The limit positions of plate 100 are established by a pair of adjustable bumpers 116 mounted on the underside of the plate 99 and positioned for engagement by the adjacent one of two relatively spaced arms depending from the upstream end of the swivel plate 100.

In order to prevent the possibility of having one of the pushers 30 jam at the upstream end of either of the guide angles 81 or 85, a knife-edged triangular block 120 is mounted below the plate 99 but extends through the opening 107 to a position wherein its two downstream sides are aligned with the guide angles 81 and 85. The mounting for this block provides for its downward swinging movement in the event that it should be struck by the bearing 35 on a pusher 30.

More specifically, the block 120 is mounted on a double armed bracket 121 having its arms pivotally mounted on shouldered screws 122 set in brackets 123 depending from the plate 99. An extension on the upstream end of each of these bracket arms is connected by a tension spring 125 to a bracket 126 mounted on the underside of plate 99, and these springs bias the bracket 121 in clockwise direction as viewed in FIG. 7 to raise the block 120 to a limit position established by engagement with the underside of plate 99 by a bumper 127 carried by an extension 128 of bracket 121.

In the operation of the conveyor, if a given set of pushers is assigned to a carton for delivery to one of the branch lines downstream from the first pair 13–14 in FIG. 1, the switch 44 to which they are initially delivered will remain in its retracted position for travel of this set of pushers therepast. For present purposes, however, it is assumed that the carton is to be delivered to the first left-hand branch line 13 in FIG. 1. The right-hand switch 44 in FIG. 5 is therefore actuated to divert the appropriate number of pushers to the left, for travel of their associated bearings 35 along the guide angle 84 toward the switch assembly 90.

As previously described, this diverting action of switch 44 is initiated by actuation of the solenoid valve 56 therein to cause the associated pressure cylinder 55 to move the switch member 50 connected thereto to its diverting position. The operating circuit for this solenoid valve is so connected with the solenoid valve 115 in the adjacent switch assembly 90 that in timed relation with the travel of the first pusher along the guide angle 84, the associated swivel plate 100 will be moved to its left-hand position wherein the block 105 thereon fills the gap between guide angle 84 and block 120. The block 105 thus continues the guiding action on each of the bearings 35 as they move to and along block 120 and guide angle 84, and the parts remain in this position until the system requires discharge of a carton to the other branch conveyor at the same cross-over station.

At that point, the same operation occurs in the opposite hand direction. When the solenoid valve in the left-hand switch assembly 44 is actuated to effect diverting of successive pushers 30 to the right, the valve 115 will be actuated in similarly timed relation to cause cylinder 110 to swing swivel plate 100 clockwise to its other limit position wherein the block 106 fills the gap between the track 80 and the block 120.

If any bearing 35 should strike the knife edge of the block 120 during a cross-over operation, either of two results will occur. If the bearing does not strike the edge of block 120 head on, it will still be deflected to the proper side of this block for continued travel with the apron 20 in the desired direction, and it is possible that this deflection will cause limited downward pivoting of the block. If the bearing should hit the knife edge head on, or if it should be jammed between the knife edge and the proper block 105 or 106, then block 120 will pivot downwardly sufficiently so that the bearing will travel over it and between the upstream ends of the guide tracks 81 and 85. In the latter case, it will simply continue to travel with the apron until it reaches the next switching assembly 115, which will direct it to one of its associated guide tracks 81 and 85 and thus return it to the side of the track. Thus the possibility of jamming of a pusher to an extent which will stall the conveyor is effectively prevented.

It should also be noted that even if the switching assembly 115 fails to operate so that the swivel plate 100 is in the wrong position, jamming of the conveyor will be effectively prevented. Thus if it is assumed that in FIG. 6, the swivel plate 100 should be in its left-hand position but instead remains in its right-hand position, the block 105 thereon would be in the path of bearings 35 which have been diverted to travel along the guide track 84. However, since the tracks 81 and 84 define and include an angle of substantially less than 90°, e.g. 60°, each such bearing 35 will impinge on the block 105 and/or the side of the block 120 at a correspondingly acute angle of incidence and will therefore be deflected to the guide angle 81 and guide it thereby back to the side of the apron. Thus while the carton to be delivered by those pushers will remain on the main conveyor apron for recirculation, no jamming of the conveyor will occur.

Figure 2:
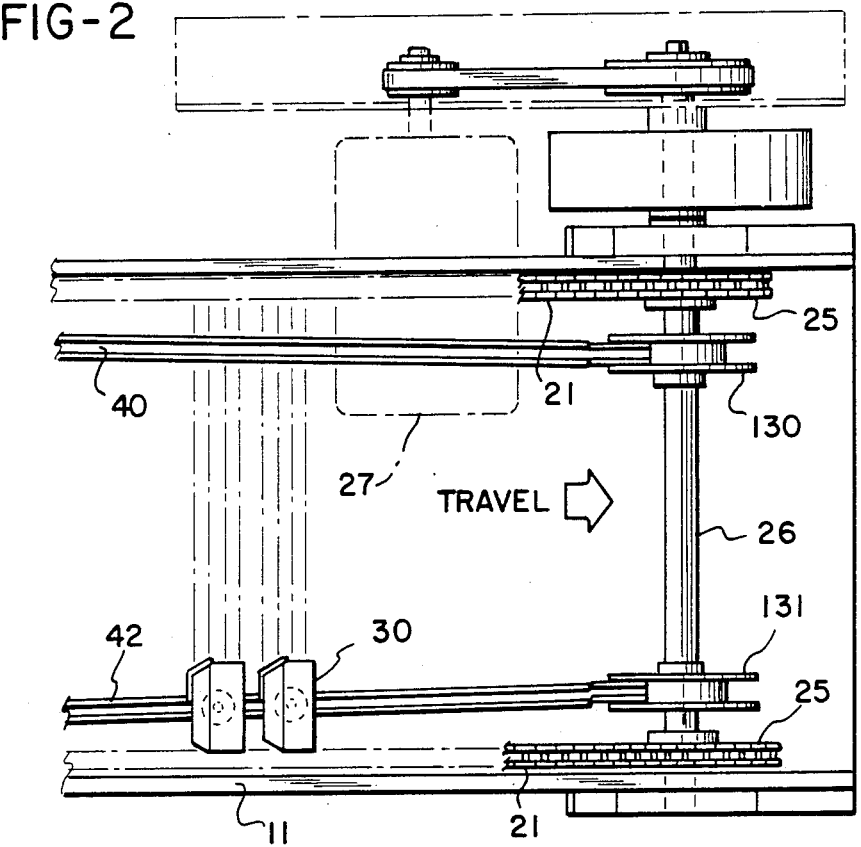
FIG. 2 is a partial plan view of the drive end of the conveyor of FIG. 1.

At the downstream end of the conveyor, as shown in FIGS. 2 and 8, the successive sets of pushers pass over guide pulleys 130 or 131 on the drive shaft 26 for chains 21 to inverted pin guide channels 132-133 which lead back toward the upstream end of the conveyor along the side edges of the return run of apron 20. These channels lead to a pair of converging inverted guide angles 134 (FIG. 8) by which the successive packers are guided to the center of the conveyor and into an inverted switch assembly 135 which may be identical with the switches 44. The operation of switch assembly 135 is to divert successive groups of pushers to one side or the other of a V-shaped guide track assembly comprising a triangular block assembly 140 which corresponds in function to parts 62 and 65 in FIG. 4, and diverging guide angles 142 and 143 which lead to the guide pulleys 70 and 72 respectively.

Operation of the switch assembly 135 is effected and controlled by the control system for the conveyor as a whole, in accordance with the size of each successive carton and the side of the main conveyor to which it is to be delivered. Thus referring to FIG. 1, the pushers 30 associated with cartons F and H were initially directed to the left side of the conveyor by the switch assembly 135, the pushers associated with cartons G and I were similarly directed to the right side of the conveyor, and so forth.

While this selective sorting of pushers could be carried out by an inverted switch assembly 44 at the side of the return run of the apron 20, the centrally located switch assembly 135 provides the important advantage that each pusher needs to travel across only one-half of the width of the apron to reach its preassigned position. This in turn means that an optical scanner, such as is commonly used to control this switch assembly in accordance with information applied to each of the cartons to be sorted, can be positioned beside the supply line 12 correspondingly closer to the upstream end of the sorter section of the conveyor, thereby saving valuable space at the upstream end of the sorting conveyor.

It will accordingly be seen that the present invention provides a sorting conveyor having all of the advantages of the conveyor shown in Case A plus the ability to sort packages to branch conveyors which are directly opposite each other as well as being relatively closely spaced along the sides of the main conveyor. More specifically, the only limitation on how closely branch conveyors can be spaced on the same side of the main conveyor is the length of each cross-over section, and as shown in FIG. 5, adjacent cross-over sections need to be spaced from each other only by a sufficient distance to accommodate the switch assembly 90 for each section.

As specific examples, for a sortation conveyor 42 inches wide, each cross-over section requires an overall length of only 6½ feet, which means that the branch conveyors can be spaced with their center lines only 6½ feet apart. Similarly for a conveyor 60 inches in width, each cross-over section need be only approximately 9 feet in length. In addition, the cross-over features of the invention are so effective that contiguous cartons on the main conveyor can be delivered to opposite sides of the main conveyor at the same cross-over section, as is illustrated by cartons B and C in FIG. 1.

It should be noted that while the illustrated embodiment of the invention has the branch conveyors directly opposite each other in pairs along the main line, the invention is not limited to that arrangement. Rather, the individual branch conveyors in each pair can be offset with respect to each other so long as their associated cross-over switch assembly 90 is correspondingly offset to one side or the other of the frame, and the associated tracks 80, 81 and 84-85 are similarly made of the appropriately different lengths.

Such a modified arrangement is shown in FIG. 9, wherein the branch track 15' is spaced downstream with respect to the branch track 16', and the associated cross-over switch assembly 90 is spaced to the right of the center of the frame. As illustrated, this in turn requires that the guide tracks 80' and 85' be longer than the guide tracks 81' and 84', and that the switches 44 be correspondingly offset lengthwise of the frame. Otherwise, this modified arrangement will be the same in structure and function as already described, and it will also be apparent that there are practical limits to the extent that such modification is desirable since in general, the most compact arrangement will be one wherein the branch lines in each pair are directly opposed to one another.

While the form of apparatus herein described constitutes a preferred embodiment of this invention, it is to be understood that the invention is not limited to this precise form of apparatus, and that changes may be made therein without departing from the scope of the invention which is defined in the appended claims.

What is claimed is:

1. A carton conveyor system including a frame defining a main line and at least one pair of substantially directly opposed branch lines leading from opposite sides of said main line, comprising:

(a) an endless apron supported for movement on said frame to define a top conveying run and a bottom return run,
(b) means for driving said apron,
(c) a plurality of pusher elements mounted for sliding movement on said apron from one side thereof to the other,
(d) each said pusher element having a guide member depending therefrom,
(e) means for selectively causing each of said elements to be aligned along one or the other of the side edges of said apron at the upstream end of said top run thereof,
(f) diverting means mounted adjacent each side of said frame upstream from each said branch outlet for shifting movement between a retracted position and an advanced position wherein it cooperates with successive said guide members to divert successive said pusher elements away from the adjacent edge of said apron,
(g) a pair of guide tracks extending in cross-defining relation across said frame below said apron at a position between each said pair of branch outlets for cooperation with said guide members on successive said diverted pusher elements to guide said diverted pusher elements across said apron and thereby to push a carton from said apron to one of said pair of outlets,
(h) each of said guide tracks having a gap therein at the center of said frame,
(i) selectively operable switching means mounted on said frame for movement between alternative limit positions wherein a portion thereof fills in said gap in one or the other of said guide tracks while leaving the other said gap open for passage of said guide members,
(j) said switching means comprising a a swivel member mounted for pivotal movement below said gap between said limit positions,
(k) said swivel member having mounted on the upper side thereof a pair of non-parallel spaced block members, and
(l) each of said block members being proportioned to fill in said gap in one of said guide tracks in each of said limit positions of said swivel member.

2. A conveyor system as defined in claim 1 further comprising control means for effecting shifting movement of a selected one of said diverting means to said advanced position thereof to divert successive said pusher elements toward the opposite said branch outlet, and means responsive to said action of said control means for effecting movement of said switching means to said position thereof opening said gap in the path of said diverted pusher elements.

3. A conveyor system as defined in claim 1 wherein said switching means is mounted for pivotal movement between said limit positions thereof.

4. A conveyor system as defined in claim 1 wherein said switching means includes a member having thereon surface means which form a continuation of one of said guide tracks in each of said limit positions thereof while blocking the other of said tracks.

5. A conveyor system as defined in claim 1 further comprising means cooperating with said return run of said apron to guide all of said pusher elements to the center of said apron at a station below and closely adjacent the upstream end of said frame, and switching means at said station for selectively directing successive said pusher elements to one or the other side of said apron at the upstream end of said top conveying end thereof.

6. A carton conveyor system including a frame defining a main line and at least one pair of substantially directly opposed branch lines leading from opposite sides of said main line, comprising:
(a) an endless apron supported for movement on said frame to define a top conveying run and a bottom return run,
(b) means for driving said apron,
(c) a plurality of pusher elements mounted for sliding movement on said apron from one sioe thereof to the other,
(d) each said pusher element having a guide member depending therefrom,
(e) means for selectively causing each of said elements to be aligned along one or the other of the side edges of said apron at the upstream end of said top run thereof.
(f) diverting means mounted adjacent each side of said frame upstream from each said branch outlet for shifting movement between a retracted position and an advanced position wherein it cooperates with successive said guide members to divert successive said pusher elements away from the adjacent edge of said apron,
(g) a pair of guide tracks extending in cross-defining relation across said frame below said apron at a position between each said pair of branch outlets for cooperation with said guide members on successive said diverted pusher elements to guide said diverted pusher elements across said apron and thereby to push a carton from said apron to one of said pair of outlets,
(h) each of said guide tracks having a gap therein at the center of said frame,
(i) a generally triangular guide block positioned in said gap between said switching means and the downstream portions of said guide tracks,
(j) said guide block having side surfaces aligned with the guide surfaces of said guide tracks,
(k) and means mounting said guide block for movement out of the way of each of said pusher element guide members which impacts with the upstream end thereof.

7. A conveyor system as defined in claim 6 further comprising yieldable means normally biasing said guide block to a raised limit position from which it is subject to downward swinging movement upon impact therewith by one of said guide members.

8. A conveyor system as defined in claim 4 wherein the upstream portions of said pair of guide tracks define an acute angle leading to said gap whereby any of said guide members traveling along the one of said guide tracks blocked by said switching means will be deflected thereby to the downstream portion of the other of said tracks.

* * * * *